(12) United States Patent
Nakamura et al.

(10) Patent No.: US 11,361,910 B2
(45) Date of Patent: Jun. 14, 2022

(54) POWER STORAGE MODULE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventors: Tomohiro Nakamura, Kariya (JP); Yuki Chujo, Kariya (JP); Masahiro Yamada, Kariya (JP); Takayuki Hirose, Kariya (JP); Nobuyasu Haga, Seto (JP); Motoyoshi Okumura, Nagoya (JP)

(73) Assignees: KABUSHIKI KAISHA TOYOTA JIDOSHOKKI, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 101 days.

(21) Appl. No.: 16/755,012

(22) PCT Filed: Sep. 3, 2018

(86) PCT No.: PCT/JP2018/032631
§ 371 (c)(1),
(2) Date: Apr. 9, 2020

(87) PCT Pub. No.: WO2019/073717
PCT Pub. Date: Apr. 18, 2019

(65) Prior Publication Data
US 2020/0350525 A1    Nov. 5, 2020

(30) Foreign Application Priority Data
Oct. 10, 2017    (JP) .............................. JP2017-196892

(51) Int. Cl.
*H01G 11/28*    (2013.01)
*H01M 10/04*    (2006.01)
(Continued)

(52) U.S. Cl.
CPC ........ *H01G 11/28* (2013.01); *H01M 10/0418* (2013.01); *H01M 50/183* (2021.01); *H01M 2004/029* (2013.01); *H01M 2220/20* (2013.01)

(58) Field of Classification Search
None
See application file for complete search history.

(56) References Cited

U.S. PATENT DOCUMENTS

2004/0253512 A1    12/2004    Watanabe et al.
2005/0026517 A1    2/2005    Suzuki

FOREIGN PATENT DOCUMENTS

JP    04-248274 A    9/1992
JP    2005-5163 A    1/2005
(Continued)

OTHER PUBLICATIONS

International Preliminary Report on Patentability with the translation of Written Opinion dated Apr. 23, 2020, from the International Bureau in International Application No. PCT/JP2018/32631.

*Primary Examiner* — Helen Oi K Conley
(74) *Attorney, Agent, or Firm* — Sughrue Mion, PLLC

(57) ABSTRACT

A power storage module includes an electrode laminate in which bipolar electrodes are laminated and a sealing body formed of a resin. The bipolar electrode includes an electrode plate, a positive electrode provided on one surface of the electrode plate, and a negative electrode provided on another surface of the electrode plate. The sealing body is provided on a side surface of the electrode laminate to surround an edge portion of the bipolar electrode. The sealing body includes a first resin portion and a second resin portion. The first resin portion is welded to the edge portion of the bipolar electrode. The second resin portion surrounds the first resin portion from an outer side along the side surface. A mold shrinkage factor of the first resin portion is (Continued)

lower than a mold shrinkage factor of the second resin portion.

20 Claims, 5 Drawing Sheets

(51) Int. Cl.
*H01M 50/183* (2021.01)
*H01M 4/02* (2006.01)

(56) References Cited

FOREIGN PATENT DOCUMENTS

| | | | |
|---|---|---|---|
| JP | 2005-135764 | A | 5/2005 |
| JP | 2005-259379 | A | 9/2005 |
| JP | 4248274 | B2 | 4/2009 |
| JP | 2011-233298 | A | 11/2011 |

POWER STORAGE MODULE

CROSS REFERENCE TO RELATED APPLICATIONS

This application is a National Stage of International Application No. PCT/JP2018/032631 filed Sep. 3, 2018, claiming priority based on Japanese Patent Application No. 2017-196892 filed Oct. 10, 2017.

TECHNICAL FIELD

One aspect of the present invention relates to a power storage module.

BACKGROUND ART

As a power storage module of the related art, a bipolar battery including a bipolar electrode in which a positive electrode is formed on one surface of an electrode plate and a negative electrode is formed on another surface of the electrode plate is known. For example, a bipolar battery disclosed in Patent Literature 1 includes: an electrode laminate in which a plurality of bipolar electrodes are laminated; and a cell casing (sealing body) formed of polypropylene and provided on a side surface of the electrode laminate. A polypropylene layer is provided in an edge portion of the bipolar electrode, and the bipolar electrode and the cell casing are strongly fixed by integral molding through the polypropylene layer. As a result, an electrolytic solution can be sealed.

CITATION LIST

Patent Literature

[Patent Literature 1] Japanese Unexamined Patent Publication No. 2005-135764

SUMMARY OF INVENTION

Technical Problem

In the above-described power storage module, a negative electrode terminal electrode including an electrode plate in which a negative electrode is formed on an inner surface is disposed at one end of the electrode laminate in a laminating direction. The electrode plate of the negative electrode terminal electrode is sealed with the sealing body. When the electrolytic solution is formed of an alkali aqueous solution, due to a so-called alkali creep phenomenon, the electrolytic solution may be transmitted to the electrode plate of the negative electrode terminal electrode, may pass through the sealing body and the electrode plate, and may leak to an outer surface side of the electrode plate.

One aspect of the present invention has been made in order to solve the above-described problem and provides a power storage module in which leakage of an electrolytic solution can be suppressed.

Solution to Problem

A power storage module according to one aspect of the present invention includes an electrode laminate in which bipolar electrodes are laminated and a sealing body formed of a resin. The bipolar electrode includes an electrode plate, a positive electrode provided on one surface of the electrode plate, and a negative electrode provided on another surface of the electrode plate. The sealing body is provided on a side surface of the electrode laminate to surround an edge portion of the bipolar electrode. The sealing body includes a first resin portion and a second resin portion. The first resin portion is welded to the edge portion of the bipolar electrode. The second resin portion surrounds the first resin portion from an outer side along the side surface. A mold shrinkage factor of the first resin portion is lower than a mold shrinkage factor of the second resin portion.

In the power storage module, the sealing body formed of a resin includes the first resin portion welded to the edge portion of the bipolar electrode. When the first resin portion is welded to the edge portion of the bipolar electrode, the state of the first resin portion changes from a melted state to a solidified state such that the first resin portion is solidified and shrinks. As a result, a gap is formed between the edge portion of the bipolar electrode and the first resin portion, and this gap may function as a passage of an electrolytic solution. In the power storage module, the mold shrinkage factor of the first resin portion is lower than the mold shrinkage factor of the second resin portion. Therefore, the above-described gap is not likely to be formed as compared to a case where the mold shrinkage factor of the first resin portion is equal to the mold shrinkage factor of the second resin portion. Accordingly, the leakage of the electrolytic solution can be suppressed.

A power storage module according to one aspect of the present invention includes an electrode laminate in which bipolar electrodes are laminated and a sealing body formed of a resin. The bipolar electrode includes an electrode plate, a positive electrode provided on one surface of the electrode plate, and a negative electrode provided on another surface of the electrode plate. The sealing body is provided on a side surface of the electrode laminate to surround an edge portion of the bipolar electrode. The sealing body includes a first resin portion and a second resin portion. The first resin portion is welded to the edge portion of the bipolar electrode. The second resin portion surrounds the first resin portion from an outer side along the side surface. A melt viscosity of the first resin portion is higher than a melt viscosity of the second resin portion.

In the power storage module, the sealing body formed of a resin includes the first resin portion welded to the edge portion of the bipolar electrode. When the fluidity of the melted first resin portion is low, the first resin portion is not likely to be disposed along the surface shape of the edge portion of the bipolar electrode during being welded to the edge portion of the bipolar electrode. As a result, a gap is formed between the edge portion of the bipolar electrode and the first resin portion, and this gap may function as a passage of an electrolytic solution. In the power storage module, the melt viscosity of the first resin portion is lower than the melt viscosity of the second resin portion. Therefore, the melted first resin portion has high fluidity as compared to a case where the melt viscosity of the first resin portion is equal to the melt viscosity of the second resin portion. Thus, the first resin portion is likely to be disposed along the surface shape of the edge portion of the bipolar electrode. Therefore, the above-described gap is not likely to be formed. Accordingly, the leakage of the electrolytic solution can be suppressed.

In the above-described power storage module, the melt viscosity of the first resin portion may be 4.5 g/10 min or higher and lower than 100 g/10 min. In this case, the configuration in which the melt viscosity of the first resin portion is higher than the melt viscosity of the second resin portion can be easily implemented.

In the above-described power storage module, the melt viscosity of the second resin portion may be 1.0 g/10 min or lower. In this case, the configuration in which the melt viscosity of the first resin portion is higher than the melt viscosity of the second resin portion can be easily implemented.

A power storage module according to one aspect of the present invention includes an electrode laminate in which bipolar electrodes are laminated and a sealing body formed of a resin. The bipolar electrode includes an electrode plate, a positive electrode provided on one surface of the electrode plate, and a negative electrode provided on another surface of the electrode plate. The sealing body is provided on a side surface of the electrode laminate to surround an edge portion of the bipolar electrode. The sealing body includes a first resin portion and a second resin portion. The first resin portion is welded to the edge portion of the bipolar electrode. The second resin portion surrounds the first resin portion from an outer side along the side surface. A melting point of the first resin portion is lower than a melting point of the second resin portion.

In the power storage module, the sealing body formed of a resin includes the first resin portion welded to the edge portion of the bipolar electrode. When the first resin portion is cooled after welding, the first resin portion thermally shrinks according to the amount of change in temperature. As a result, a gap is formed between the edge portion of the bipolar electrode and the first resin portion, and this gap may function as a passage of an electrolytic solution. In the power storage module, the melting point of the first resin portion is lower than the melting point of the second resin portion. Therefore, the welding of the first resin portion can be performed at a low temperature as compared to a case where the melting point of the first resin portion is equal to the melting point of the second resin portion. As a result, the achieving temperature of the first resin portion decreases. Therefore, when the first resin portion is cooled after welding, the amount of change in temperature decreases, and the amount of thermal shrinkage of the first resin portion can be reduced. Therefore, the above-described gap is not likely to be formed. Accordingly, the leakage of the electrolytic solution can be suppressed.

In the above-described power storage module, the first resin portion may be formed of random polypropylene. For example, the random polypropylene has a lower melting point than homopropylene. Accordingly, in this case, the configuration in which the melting point of the first resin portion is lower than the melting point of the second resin portion can be implemented.

In the above-described power storage module, a Young's modulus of the second resin portion may be higher than a Young's modulus of the first resin portion. In this case, impact resistance of the power storage module to external impact can be improved as compared to a case where the Young's modulus of the second resin portion is equal to the Young's modulus of the first resin portion.

In the above-described power storage module, the Young's modulus of the first resin portion may be 100 MPa or higher and 1000 MPa or lower. In this case, the configuration in which the Young's modulus of the second resin portion is higher than the Young's modulus of the first resin portion can be easily implemented.

In the above-described power storage module, the Young's modulus of the second resin portion may be 1000 MPa or higher. In this case, the configuration in which the Young's modulus of the second resin portion is higher than the Young's modulus of the first resin portion can be easily implemented.

In the above-described power storage module, the second resin portion may be formed of modified polyphenylene ether. Modified polyphenylene ether has a high Young's modulus. Accordingly, in this case, the configuration in which the Young's modulus of the second resin portion is higher than the Young's modulus of the first resin portion can be easily implemented.

In the above-described power storage module, the edge portion may be roughened. In this case, in the edge portion, the bipolar electrode and the first resin portion are entangled. Therefore, even when a gap is formed between the bipolar electrode and the first resin portion and functions as a passage of the electrolytic solution, the length of a path through which the electrolytic solution leaks is longer as compared to a case where the edge portion is not roughened. Accordingly, the leakage of the electrolytic solution can be suppressed.

Advantageous Effects of Invention

According to one aspect of the present invention, a power storage module in which the leakage of an electrolytic solution can be suppressed can be provided.

DESCRIPTION OF EMBODIMENTS

Figure 1:
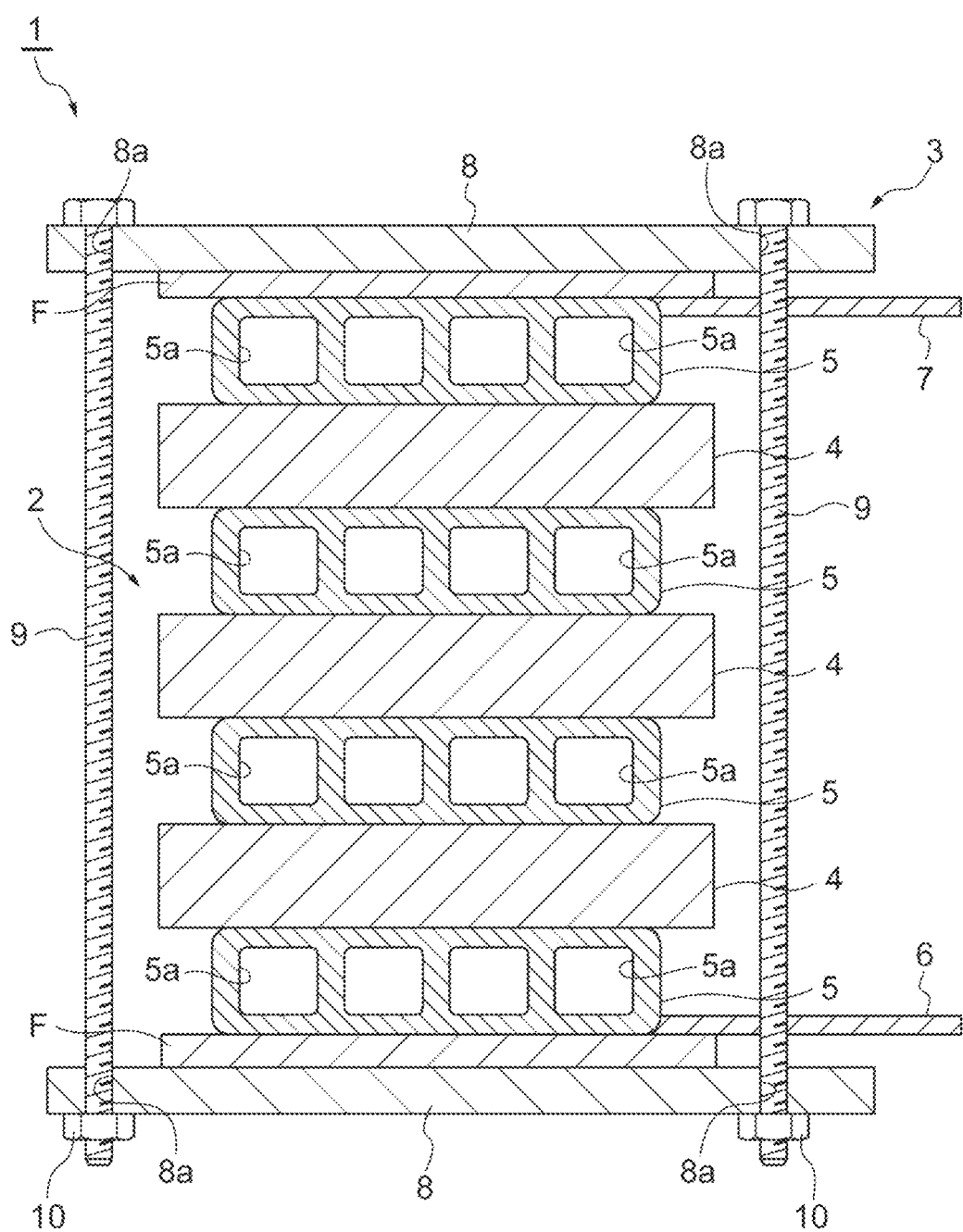
FIG. 1 is a schematic sectional view showing one embodiment of a power storage device.

Hereinafter, the details of an embodiment of the present invention will be described with reference to the accompanying drawings. In the description, the same components or components having the same functions will be represented by the same reference numerals, and the description thereof will not be repeated.

FIG. 1 is a schematic sectional view showing one embodiment of a power storage device. For example, a power storage device 1 shown FIG. 1 is used as batteries of various vehicles such as a forklift, a hybrid vehicle, or an electric vehicle. The power storage device 1 includes: a power storage module laminate 2 including a plurality of power storage modules 4 that are laminated; and a binding member 3 that applies a binding load to the power storage module laminate 2 in a laminating direction.

The power storage module laminate 2 includes a plurality of (in the present embodiment, three) power storage modules 4; and a plurality of (in the present embodiment, four) conductive plates 5. The power storage module 4 is, for example, a bipolar battery including a bipolar electrode 14 described below and has a rectangular shape when seen from the laminating direction. The power storage module 4 is, for example, a secondary battery such as a nickel metal hybrid secondary battery or a lithium ion secondary battery or an electric double layer capacitor. In the following description, a nickel metal hybrid secondary battery is used as an example.

Power storage modules 4 and 4 adjacent to each other in the laminating direction are electrically connected to each other through the conductive plate 5. The conductive plates 5 are disposed between the power storage modules 4 and 4 adjacent to each other in the laminating direction and on outer sides of the power storage modules 4 positioned at laminate ends, respectively. A positive electrode terminal 6 is connected to one conductive plate 5 that is disposed on the outer side of the power storage module 4 positioned at the laminate end. A negative electrode terminal 7 is connected to another conductive plate 5 that is disposed on the outer side of the power storage module 4 positioned at the laminate end. For example, the positive electrode terminal 6 and the negative electrode terminal 7 extend from edge portions of the conductive plate 5 in a direction intersecting the laminating direction. The power storage device 1 is charged and discharged by the positive electrode terminal 6 and the negative electrode terminal 7.

In each of the conductive plates 5, a plurality of flow paths 5a through which a coolant such as air flows are provided. For example, each of the flow paths 5a extends parallel to a direction perpendicular to the laminating direction and the direction in which the positive electrode terminal 6 and the negative electrode terminal 7 extend. By circulating the coolant through the flow paths 5a, the conductive plate 5 has a function as a connection member that electrically connects the power storage modules 4 and 4 and a function as a heat dissipation plate that dissipates heat generated from the power storage module 4. In the example of FIG. 1, the area of the conductive plate 5 is less than the area of the power storage module 4 when seen from the laminating direction. From the viewpoint of improving heat dissipation, the area of the conductive plate 5 may be more than or equal to the area of the power storage module 4.

The binding member 3 includes a pair of end plates 8 and 8, a fastening bolt 9, and a nut 10. The power storage module laminate 2 is interposed between the pair of end plates 8 and 8 in the laminating direction. The fastening bolt 9 and the nut 10 fasten the end plates 8 and 8. The end plate 8 is a rectangular metal plate having an area more than the area of the power storage module 4 and the conductive plate 5 when seen from the laminating direction. A film F having electrical insulating properties is provided on an inner surface (surface on the power storage module laminate 2 side) of the end plate 8. The end plate 8 and the conductive plate 5 are insulated from each other by the film F.

In an edge portion of the end plate 8, an insertion hole 8a is provided at a position on the outer side further than the power storage module laminate 2. The fastening bolt 9 is inserted from the insertion hole 8a of one end plate 8 into the insertion hole 8a of another end plate 8. The nut 10 is screwed into a distal end portion of the fastening bolt 9 protruding from the insertion hole 8a of the other end plate 8. As a result, the power storage module 4 and the conductive plate 5 are interposed between the end plates 8 and 8 to form a unit as the power storage module laminate 2. A binding load is applied to the power storage module laminate 2 in the laminating direction.

Figure 2:
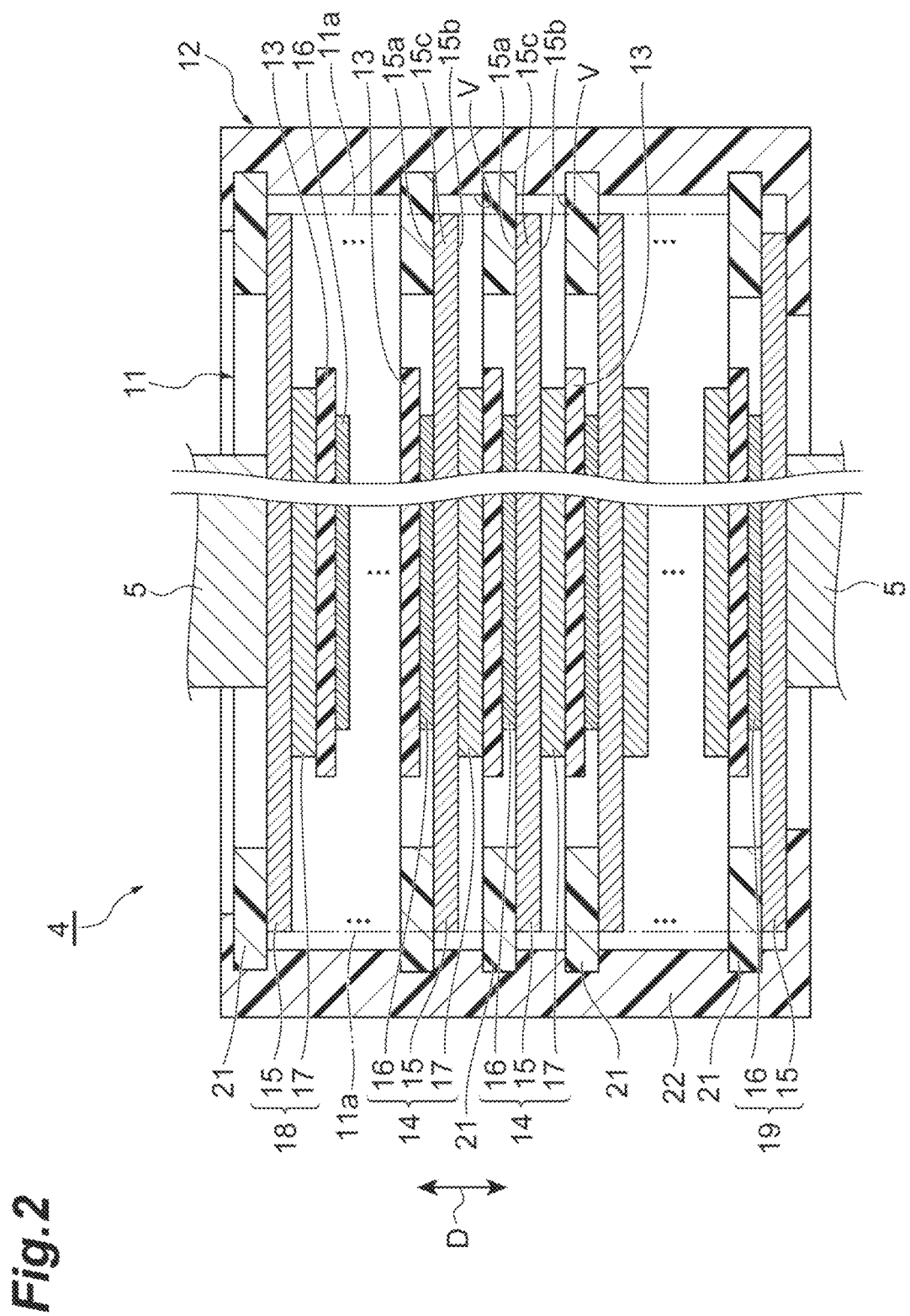
FIG. 2 is a schematic sectional view showing an internal configuration of the power storage module of FIG. 1.

Next, a configuration of the power storage module 4 will be described in more detail. FIG. 2 is a schematic sectional view showing an internal configuration of the power storage module 4. As shown in the drawing, the power storage module 4 includes an electrode laminate 11 and a sealing body 12 formed of a resin that seals the electrode laminate 11.

In the electrode laminate 11, a plurality of bipolar electrodes 14 are laminated with a separator 13 interposed therebetween. In this example, a laminating direction D of the electrode laminate 11 matches the laminating direction of the power storage module laminate 2. The electrode laminate 11 includes a side surface 11a extending in the laminating direction D. The bipolar electrode 14 includes an electrode plate 15, a positive electrode 16 provided on a first surface 15a of the electrode plate 15, and a negative electrode 17 provided on a second surface 15b of the electrode plate 15. The positive electrode 16 is a positive electrode active material layer formed by applying a positive electrode active material. The negative electrode 17 is a negative electrode active material layer formed by applying a negative electrode active material. In the electrode laminate 11, the positive electrode 16 of one bipolar electrode 14 faces the negative electrode 17 of another bipolar electrode 14 adjacent thereto in the laminating direction D with the separator 13 interposed therebetween. In the electrode laminate 11, the negative electrode 17 of one bipolar electrode 14 faces the positive electrode 16 of another bipolar electrode 14 adjacent thereto in the laminating direction D with the separator 13 interposed therebetween.

A negative electrode terminal electrode 18 is disposed at one end of the electrode laminate 11 in the laminating direction D, and a positive electrode terminal electrode 19 is disposed at another end of the electrode laminate 11 in the laminating direction D. The negative electrode terminal electrode 18 includes the electrode plate 15 and the negative electrode 17 that is provided on the second surface 15b of the electrode plate 15. The negative electrode 17 of the negative electrode terminal electrode 18 faces the positive electrode 16 of the bipolar electrode 14 at one end in the laminating direction D with the separator 13 interposed therebetween. One conductive plate 5 adjacent to the power storage module 4 is in contact with the first surface 15a of the electrode plate 15 of the negative electrode terminal electrode 18. The positive electrode terminal electrode 19 includes the electrode plate 15 and the positive electrode 16 that is provided on the first surface 15a of the electrode plate 15. Another conductive plate 5 adjacent to the power storage module 4 is in contact with the second surface 15b of the electrode plate 15 of the positive electrode terminal electrode 19. The positive electrode 16 of the positive electrode terminal electrode 19 faces the negative electrode 17 of the bipolar electrode 14 at another end in the laminating direction D with the separator 13 interposed therebetween.

The electrode plate 15 is formed of metal and is, for example, a nickel or nickel-plated steel plate. The electrode plate 15 is a rectangular metal foil formed of nickel. An edge portion (edge portion of the bipolar electrode 14) 15c of the electrode plate 15 has a rectangular frame shape. The edge portion 15c is a non-applied region to which the positive electrode active material and the negative electrode active material are not applied. Examples of the positive electrode active material forming the positive electrode 16 include nickel hydroxide. Examples of the negative electrode active material forming the negative electrode 17 include a hydrogen storage alloy. In the present embodiment, a region where the negative electrode 17 is formed on the second surface 15b of the electrode plate 15 is slightly larger than a region where the positive electrode 16 is formed on the first surface 15a of the electrode plate 15.

The separator 13 is formed, for example, in a sheet shape. Examples of the separator 13 include a porous film formed of a polyolefin resin such as polyethylene (PE) or polypropylene (PP) and fabric or non-woven fabric formed of polypropylene, polyethylene terephthalate (PET), methyl cellulose, or the like. The separator 13 may be a separator that is reinforced with a vinylidene fluoride resin compound. The separator 13 is not limited to a sheet shape and may be a bag shape.

For example, the sealing body 12 is formed in a rectangular cylindrical shape using an insulating resin. The sealing body 12 is provided on the side surface 11a of the electrode laminate 11 to cover the edge portion 15c. The sealing body 12 holds the edge portion 15c on the side surface 11a. The sealing body 12 includes a first resin portion 21 welded to the edge portion 15c and a second resin portion 22 surrounding the first resin portion 21 from an outer side along the side surface 11a. When seen from the laminating direction D, the first resin portion 21 has a rectangular frame shape and is continuously provided across the entire circumference of the edge portion 15c. The first resin portion 21 is welded to the edge portion 15c of the electrode plate 15 on the first surface 15a side. The first resin portion 21 is welded by, for example, ultrasonic waves or heat. The first resin portion 21 is a film having a predetermined thickness (length in the laminating direction D). An end surface of the electrode plate 15 is exposed from the first resin portion 21. A part on the inner side of the first resin portion 21 is positioned between the edge portions 15c of the electrode plates 15 adjacent to each other in the laminating direction D. A part on the outer side of the first resin portion 21 protrudes from the electrode plate 15 to the outer side. The part of the outer side of the first resin portion 21 is buried in the second resin portion 22. The first resin portions 21 and 21 adjacent to each other in the laminating direction D are separated from each other.

The second resin portion 22 is provided on the outer side of the electrode laminate 11 and the first resin portion 21 and forms an outer wall (housing) of the power storage module 4. The second resin portion 22 is formed by, for example, injection molding using a resin and extends across the entire length of the electrode laminate 11 in the laminating direction D. The second resin portion 22 is a cylindrical portion that extends in the laminating direction D as an axis direction. The second resin portion 22 covers an outer surface of the first resin portion 21 that extends in the laminating direction D. The second resin portion 22 is welded to the outer surface of the first resin portion 21, for example, by heat during injection molding.

The second resin portion 22 seals the bipolar electrodes 14 and 14 adjacent to each other in the laminating direction D, the negative electrode terminal electrode 18 and the bipolar electrode 14 adjacent to each other in the laminating direction D, and the positive electrode terminal electrode 19 and the bipolar electrode 14 adjacent to each other in the laminating direction D, respectively. As a result, internal spaces V that are airtightly partitioned are formed between the bipolar electrodes 14 and 14 adjacent to each other in the laminating direction D, between the negative electrode terminal electrode 18 and the bipolar electrode 14 adjacent to each other in the laminating direction D, and between the positive electrode terminal electrode 19 and the bipolar electrode 14 adjacent to each other in the laminating direction D, respectively. The internal spaces V accommodate an electrolytic solution (not shown) formed of, for example, an alkali aqueous solution such as an aqueous potassium hydroxide solution. The electrolytic solution is impregnated into the separator 13, the positive electrode 16, and the negative electrode 17.

Examples of a resin material for forming the first resin portion 21 include a polyolefin thermoplastic resin such as polypropylene (PP) and a thermoplastic elastomer. Examples of the polypropylene include homopropylene, block polypropylene (propylene-ethylene block copolymer), and random polypropylene (propylene-ethylene random copolymer). Examples of the thermoplastic elastomer include a mixture of polypropylene and ethylene propylene rubber (EPDM) and a mixture of polypropylene and styrene rubber. Examples of a resin material for forming the second resin portion 22 include modified polyphenylene ether (modified PPE) (ZYLON (registered tradename).

The resin material for forming the first resin portion 21 and the resin material for forming the second resin portion 22 are compatible to each other. Therefore, the first resin portion 21 and the second resin portion 22 can be bonded to each other by welding. Since the electrolytic solution is strongly alkaline, the first resin portion 21 and the second resin portion 22 are formed of resin materials having strong alkali resistance.

A mold shrinkage factor (solidification shrinkage rate) of the first resin portion 21 is lower than a mold shrinkage factor of the second resin portion 22. The mold shrinkage factor of the first resin portion 21 is, for example, 0.4 or higher and 1.8 or lower. The mold shrinkage factor of the second resin portion 22 is, for example, 2.0 or higher. The mold shrinkage factor of the second resin portion 22 may be, for example, 2.5 or higher. The mold shrinkage factor is obtained according to the standards of JIS K 7152.

A melt viscosity (melt flow rate (MFR)) of the first resin portion 21 is higher than a melt viscosity of the second resin portion 22. The melt viscosity of the first resin portion 21 is, for example, 4.5 g/10 min or higher and lower than 100 g/10 min. The melt viscosity of the first resin portion 21 is, for example, 5 g/10 min or higher and 7.5 g/10 min or lower. The melt viscosity of the second resin portion is, for example, 1.0 g/10 min or lower. The melt viscosity of the second resin portion 22 is, for example, 0.5 g/10 min or lower. The melt viscosity is obtained according to the standards of ISO 1133.

A melting point of the first resin portion 21 is lower than a melting point of the second resin portion 22. In order to implement the configuration, the first resin portion 21 may be formed of random polypropylene. For example, the random polypropylene has a lower melting point than homopropylene. Therefore, the configuration in which the melting point of the first resin portion is lower than the melting point of the second resin portion can be implemented. The melting point of the first resin portion 21 is, for example, lower than 165° C. The melting point of the first resin portion 21 may be, for example, 145° C. or higher and 160° C. or lower. The melting point of the second resin portion 22 is, for example, 165° C. or higher.

A Young's modulus (tensile modulus) of the second resin portion 22 is higher than a Young's modulus of the first resin portion 21. In order to implement the configuration, the second resin portion 22 may be formed of modified polyphenylene ether. Since modified polyphenylene ether has a high Young's modulus, the configuration in which the Young's modulus of the second resin portion 22 is higher than the Young's modulus of the first resin portion 21 can be easily implemented. The Young's modulus of the first resin portion 21 is, for example, 100 MPa or higher and 1000 MPa or lower. The Young's modulus of the first resin portion 21 may be, for example, 580 MPa or higher and 837 MPa or lower. The Young's modulus of the second resin portion 22 is, for example, 1000 MPa or higher. The Young's modulus of the second resin portion 22 may be, for example, 1500 MPa or higher. In order to implement the configuration in which the Young's modulus of the first resin portion 21 is 580 MPa or higher and 837 MPa or lower, the first resin portion 21 may be formed of polypropylene.

Figure 3:
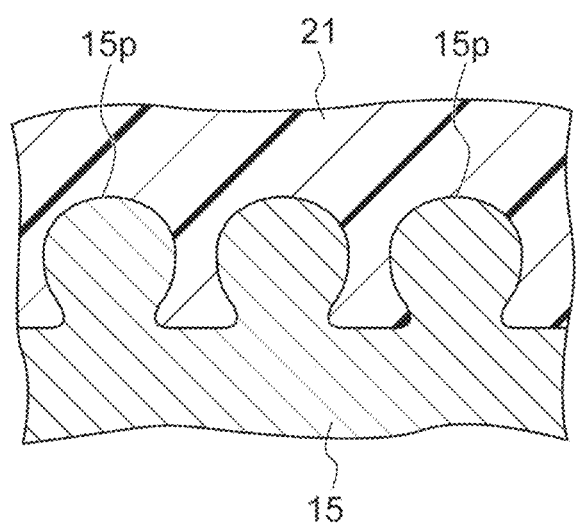
FIG. 3 is a schematic sectional view showing a joint interface between an electrode plate and a first resin portion.

FIG. 3 is a schematic sectional view showing a joint interface between the electrode plate and the first resin portion. As shown in the same drawing, the surface of the electrode plate 15 is roughened. Here, the entire surface of the electrode plate 15 including the first surface 15a, the second surface 15b, and the end surfaces shown in FIG. 2 is roughened. The surface of the electrode plate 15 is roughened, for example, by forming a plurality of protrusions 15p by electroplating. When the electrode plate 15 is roughened as described above, in the joint interface between the electrode plate 15 and the first resin portion 21, the melted first resin portion 21 enters into recessed portions formed by roughening such that the anchor effect is exhibited. As a result, a bonding strength between the electrode plate 15 and the first resin portion 21 can be improved. When the edge portion 15c of the first surface 15a is roughened at least, the effect of improving a bonding strength can be obtained. The protrusion 15p has, for example, a shape in which the diameter increases from a proximal end side toward a distal end side. In this case, a cross-sectional shape between the protrusions 15p and 15p adjacent to each other has an undercut shape, and thus the anchor effect is likely to be obtained. Since FIG. 3 is a schematic diagram, the shape, density, and the like of the protrusion 15p are not limited to those shown in FIG. 3.

Next, a method of manufacturing the above-described power storage module 4 will be described. The method of manufacturing the power storage module 4 include a primary molding step, a laminating step, a secondary molding step, and an injection step. First, in the primary molding step, a predetermined number of bipolar electrodes 14 and a pair of the negative electrode terminal electrode 18 and the positive electrode terminal electrode 19 are prepared, and the first resin portion 21 is welded to the edge portion 15c of each of the electrode plates 15 on the first surface 15a side.

In the laminating step, the electrode laminate 11 is formed by laminating the bipolar electrodes 14, the negative electrode terminal electrode 18, and the positive electrode terminal electrode 19 with the separator 13 interposed therebetween such that the first resin portion 21 is disposed between the edge portions 15c of the electrode plates 15. In the secondary molding step, the second resin portion 22 is formed to surround the first resin portion 21 by disposing the electrode laminate 11 in a mold (not shown) for injection molding and injecting the melted resin into the mold. As a result, the sealing body 12 is formed on the side surface 11a of the electrode laminate 11. In the injection step, an electrolytic solution L (refer to FIG. 4) is injected into the internal space V between the bipolar electrodes 14 and 14 after the secondary molding step. As a result, the power storage module 4 is obtained.

The power storage device 1 shown in FIG. 1 is obtained through a step of laminating the obtained power storage module 4 and the conductive plate 5 to form the power storage module laminate 2, a step of binding the power storage module laminate 2 with the binding member 3, and the like.

Figure 4:
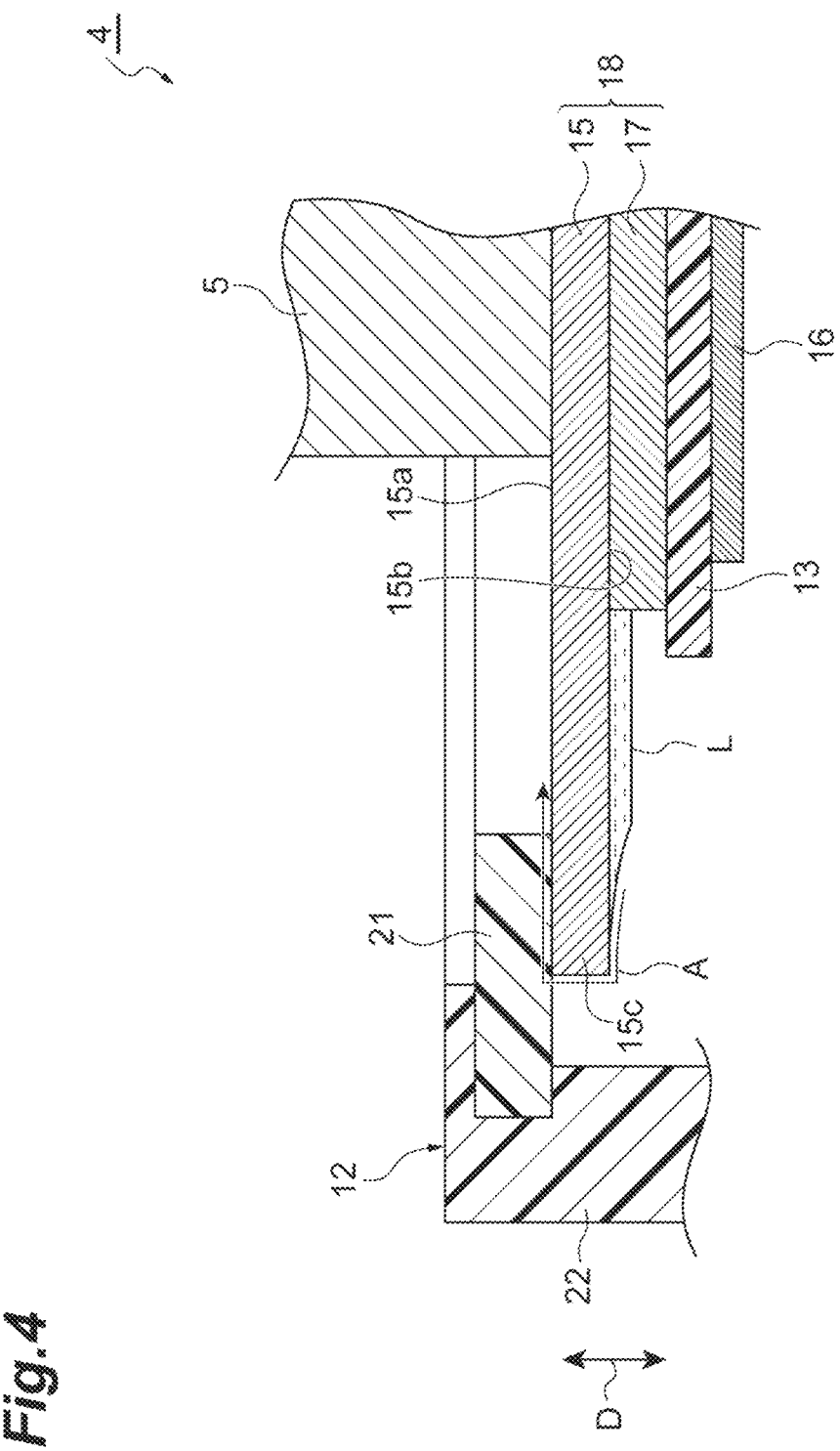
FIG. 4 is an enlarged schematic sectional view showing a part of FIG. 2.
Figure 5:
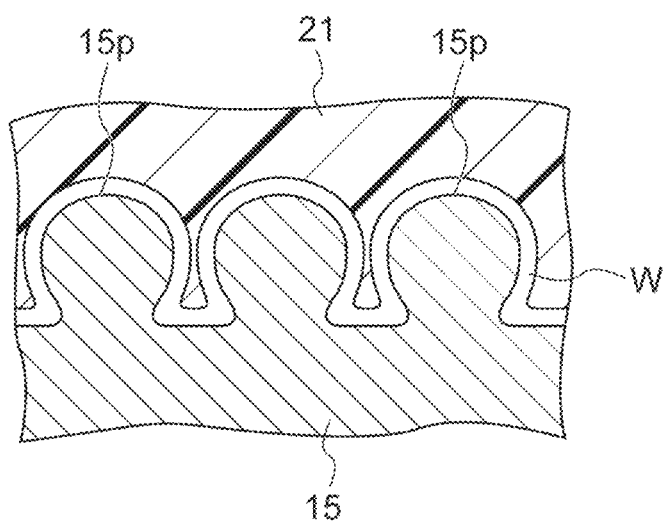
FIG. 5 is a schematic sectional view showing a gap.

Next, the effects of the power storage module 4 will be described with reference to FIGS. 4 and 5. FIG. 4 is an enlarged schematic sectional view showing a part of FIG. 2. FIG. 5 is a schematic sectional view showing a gap.

In the power storage module 4, due to a so-called alkali creep phenomenon, the electrolytic solution L may be transmitted to the electrode plate 15 of the negative electrode terminal electrode 18, may pass through the first resin portion 21 of the sealing body 12 and the electrode plate 15, and may leak to the first surface 15a side of the electrode plate 15. In FIG. 4, a movement path of the electrolytic solution L in the alkali creep phenomenon is indicated by arrow A. Due to an electrochemical factor, a fluid phenomenon, and the like, this alkali creep phenomenon occurs when the power storage device 1 is charged, discharged, and does not receive a load. The alkali creep phenomenon occurs when passages of a negative electrode potential, water, and the electrolytic solution L are present independently. In order to inhibit the alkali creep phenomenon, it is considered that a countermeasure for the passage of the electrolytic solution L is required.

In the power storage module 4, the sealing body 12 formed of a resin includes the first resin portion 21 welded to the edge portion 15c. When the first resin portion 21 is welded to the edge portion 15c, the state of the first resin portion 21 changes from a melted state to a solidified state such that the first resin portion 21 is solidified and shrinks. As a result, as shown in FIG. 5, a gap W is formed between the electrode plate 15 and the first resin portion 21, and this gap W may function as the passage of the electrolytic solution L. On the other hand, in the power storage module 4, the mold shrinkage factor of the first resin portion 21 is lower than the mold shrinkage factor of the second resin portion 22. Therefore, the above-described gap W is not likely to be formed as compared to a case where the first resin portion 21 is formed of the same resin material as that of the second resin portion 22 such that the mold shrinkage factor of the first resin portion 21 is equal to the mold shrinkage factor of the second resin portion 22. Thus, the leakage of the electrolytic solution L can be suppressed. As a result, for example, corrosion of the conductive plate 5 disposed adjacent to the negative electrode terminal electrode 18 or short-circuiting between the negative electrode terminal electrode 18 and the binding member 3, or the like can be suppressed. Therefore, the reliability can be improved.

In the power storage module 4, when the first resin portion 21 is cooled after welding, the first resin portion 21 thermally shrinks according to the amount of change in temperature. As the amount of change in temperature increases, the amount of thermal shrinkage linearly increases. Unlike solidification shrinkage, thermal shrinkage occurs not only in an actually melted portion of the first resin portion 21 but also in a non-melted portion positioned near the melted portion. Due to the thermal shrinkage, as shown in FIG. 5, the gap W is formed between the electrode plate 15 and the first resin portion 21, and this gap W may function as the passage of the electrolytic solution L. On the other hand, in the power storage module 4, the melting point of the first resin portion 21 is lower than the melting point of the second resin portion 22. Accordingly, the welding of the first resin portion 21 can be performed at a lower temperature as compared to a case where the first resin portion 21 is formed of the same resin material as that of the second resin portion 22 such that the melting point of the first resin portion 21 is equal to the melting point of the second resin portion 22. As a result, the achieving temperature of the first resin portion 21 decreases. Therefore, when the first resin portion 21 is cooled after welding, the amount of change in temperature decreases, and the amount of thermal shrinkage of the first resin portion 21 can be reduced. As a result, the above-described gap W is not likely to be formed. Accordingly, the leakage of the electrolytic solution L can be suppressed.

In addition, in the configuration in which the melting point of the first resin portion 21 is lower than the melting point of the second resin portion 22, the amount of heat input to the first resin portion 21 during welding of the first resin portion 21 can be reduced, which implements energy saving. Further, a period of time for which the temperature of the first resin portion 21 reaches the melting point can be reduced, which improves productivity.

In the power storage module 4, when the fluidity of the melted first resin portion 21 is low, the first resin portion 21 is not likely to be disposed along the surface shape of the edge portion 15c during being welded to the edge portion 15c. In particular, the surface of the electrode plate 15 is roughened by forming a plurality of protrusions 15p. Therefore, as shown in FIG. 5, the recessed portions between the adjacent protrusions 15p are not filled with the first resin portion 21 such that the gap W is formed, and this gap W may function as a passage of the electrolytic solution L. On the other hand, in the power storage module 4, the melt viscosity of the first resin portion 21 is lower than the melt viscosity of the second resin portion 22. Accordingly, the melted first resin portion 21 has high fluidity as compared to a case where the first resin portion 21 is formed of the same resin material as that of the second resin portion 22 such that the melt viscosity of the first resin portion 21 is equal to the melt viscosity of the second resin portion 22. Therefore, the first resin portion 21 enters and is filled into the recessed portions between the adjacent protrusions 15p. This way, the first resin portion 21 is disposed along the surface shape of the edge portion 15c. Therefore, the above-described gap W is not likely to be formed. Thus, the leakage of the electrolytic solution L can be suppressed.

In the power storage module 4, the Young's modulus of the second resin portion 22 is higher than the Young's modulus of the first resin portion 21. Accordingly, the strength of the second resin portion 22 can be improved as compared to a case where second resin portion 22 is formed of the same resin material as that of the first resin portion 21 such that the Young's modulus of the second resin portion 22 is equal to the Young's modulus of the first resin portion 21. The second resin portion 22 forms the outer wall of the power storage module 4. Accordingly, impact resistance of the power storage module 4 to external impact can be improved.

The surface of the electrode plate 15 is roughened by forming a plurality of protrusions 15p. Accordingly, the electrode plate 15 and the first resin portion 21 are entangled. As a result, a bonding strength between the electrode plate 15 and the first resin portion 21 is improved. In addition, even when the gap W is formed between the electrode plate 15 and the first resin portion 21 and functions as a passage of the electrolytic solution L, the length of a path through which the electrolytic solution L leaks is longer as compared to a case where the electrode plate 15 is not roughened. Accordingly, the leakage of the electrolytic solution L can be further suppressed.

The present invention is not limited to the above-described embodiment, and various modifications can be made.

The power storage module 4 only have to have at least one of the configuration in which the mold shrinkage factor of the first resin portion 21 is lower than the mold shrinkage factor of the second resin portion 22, the configuration in which the melt viscosity of the first resin portion 21 is higher than the melt viscosity of the second resin portion 22, and the configuration in which the melting point of the first resin portion 21 is lower than the melting point of the second resin portion 22.

For example, as long as the power storage module 4 has the configuration in which the mold shrinkage factor of the first resin portion 21 is lower than the mold shrinkage factor of the second resin portion 22, the melt viscosity of the first resin portion 21 may be equal to the melt viscosity of the second resin portion 22, or the melting point of the first resin portion 21 may be equal to the melting point of the second resin portion 22. For example, as long as the power storage module 4 has the configuration in which the melt viscosity of the first resin portion 21 is higher than the melt viscosity of the second resin portion 22, the mold shrinkage factor of the first resin portion 21 may be equal to the mold shrinkage factor of the second resin portion 22, or the melting point of the first resin portion 21 may be equal to the melting point of the second resin portion 22. For example, as long as the power storage module 4 has the configuration in which the melting point of the first resin portion 21 is lower than the melting point of the second resin portion 22, the mold shrinkage factor of the first resin portion 21 may be equal to the mold shrinkage factor of the second resin portion 22, or the melt viscosity of the first resin portion 21 may be equal to the melt viscosity of the second resin portion 22.

The surface of the electrode plate 15 is not necessarily roughened. The first resin portion 21 only has to be welded to the edge portion 15c. The first resin portion 21 may be welded to the edge portion 15c to cover, for example, not only the first surface 15a of the electrode plate 15 but also the end surface of the electrode plate 15. In this case, since the first resin portion 21 is also welded to the end surface of the electrode plate 15, the leakage of the electrolytic solution L can be further suppressed.

REFERENCE SIGNS LIST

4: power storage module
11: electrode laminate
11a: side surface
12: sealing body
14: bipolar electrode
15: electrode plate
15a: first surface
15b: second surface
15c: edge portion
16: positive electrode
17: negative electrode
21: first resin portion
22: second resin portion
D: laminating direction

The invention claimed is:
1. A power storage module comprising:
an electrode laminate in which bipolar electrodes including an electrode plate, a positive electrode provided on one surface of the electrode plate, and a negative electrode provided on another surface of the electrode plate are laminated; and
a sealing body formed of a resin and provided on a side surface of the electrode laminate to surround an edge portion of the bipolar electrode,
wherein the sealing body includes a first resin portion welded to the edge portion of the bipolar electrode and a second resin portion surrounding the first resin portion from an outer side along the side surface, and a mold shrinkage factor of the first resin portion is lower than a mold shrinkage factor of the second resin portion.

2. A power storage module comprising:

an electrode laminate in which bipolar electrodes including an electrode plate, a positive electrode provided on one surface of the electrode plate, and a negative electrode provided on another surface of the electrode plate are laminated; and a sealing body formed of a resin and provided on a side surface of the electrode laminate to surround an edge portion of the bipolar electrode, wherein the sealing body includes a first resin portion welded to the edge portion of the bipolar electrode and a second resin portion surrounding the first resin portion from an outer side along the side surface, and a melt viscosity of the first resin portion is higher than a melt viscosity of the second resin portion.

3. The power storage module according to claim 2, wherein the melt viscosity of the first resin portion is 4.5 g/10 min or higher and lower than 100 g/10 min.

4. The power storage module according to claim 2, wherein the melt viscosity of the second resin portion is 1.0 g/10 min or lower.

5. A power storage module comprising:

an electrode laminate in which bipolar electrodes including an electrode plate, a positive electrode provided on one surface of the electrode plate, and a negative electrode provided on another surface of the electrode plate are laminated; and a sealing body formed of a resin and provided on a side surface of the electrode laminate to surround an edge portion of the bipolar electrode, wherein the sealing body includes a first resin portion welded to the edge portion of the bipolar electrode and a second resin portion surrounding the first resin portion from an outer side along the side surface, and a melting point of the first resin portion is lower than a melting point of the second resin portion.

6. The power storage module according to claim 5, wherein the first resin portion is formed of polypropylene.

7. The power storage module according to claim 1, wherein a Young's modulus of the second resin portion is higher than a Young's modulus of the first resin portion.

8. The power storage module according to claim 7, wherein the Young's modulus of the first resin portion is 100 MPa or higher and 1000 MPa or lower.

9. The power storage module according to claim 7, wherein the Young's modulus of the second resin portion is 1000 MPa or higher.

10. The power storage module according to claim 7, wherein the second resin portion is formed of modified polyphenylene ether.

11. The power storage module according to claim 1, wherein the edge portion is roughened.

12. The power storage module according to claim 2, wherein a Young's modulus of the second resin portion is higher than a Young's modulus of the first resin portion.

13. The power storage module according to claim 3, wherein a Young's modulus of the second resin portion is higher than a Young's modulus of the first resin portion.

14. The power storage module according to claim 4, wherein a Young's modulus of the second resin portion is higher than a Young's modulus of the first resin portion.

15. The power storage module according to claim 5, wherein a Young's modulus of the second resin portion is higher than a Young's modulus of the first resin portion.

16. The power storage module according to claim 6, wherein a Young's modulus of the second resin portion is higher than a Young's modulus of the first resin portion.

17. The power storage module according to claim 6, wherein a Young's modulus of the second resin portion is higher than a Young's modulus of the first resin portion.

18. The power storage module according to claim 1, wherein a melting point of the first resin portion is lower than a melting point of the second resin portion.

19. The power storage module according to claim 2, wherein a melting point of the first resin portion is lower than a melting point of the second resin portion.

20. The power storage module according to claim 17, wherein a melting point of the first resin portion is lower than a melting point of the second resin portion.

* * * * *